United States Patent
Kato et al.

(10) Patent No.: US 12,547,146 B2
(45) Date of Patent: Feb. 10, 2026

(54) MACHINE TOOL

(71) Applicant: DMG MORI CO., LTD., Nara (JP)

(72) Inventors: Yasutaka Kato, Nara (JP); Eiichiro Gomi, Nara (JP)

(73) Assignee: DMG MORI CO., LTD., Nara (JP)

( * ) Notice: Subject to any disclaimer, the term of this patent is extended or adjusted under 35 U.S.C. 154(b) by 317 days.

(21) Appl. No.: 18/035,361

(22) PCT Filed: Nov. 4, 2020

(86) PCT No.: PCT/JP2020/041226
§ 371 (c)(1),
(2) Date: May 4, 2023

(87) PCT Pub. No.: WO2022/097208
PCT Pub. Date: May 12, 2022

(65) Prior Publication Data
US 2024/0012384 A1     Jan. 11, 2024

(51) Int. Cl.
*G05B 19/406*     (2006.01)
*G05B 19/4063*     (2006.01)

(52) U.S. Cl.
CPC ............ *G05B 19/4063* (2013.01); *G05B 2219/34465* (2013.01)

(58) Field of Classification Search
USPC ...................................................... 700/177
See application file for complete search history.

(56) References Cited

U.S. PATENT DOCUMENTS

| | | | |
|---|---|---|---|
| 2003/0060909 A1* | 3/2003 | Yamato | G05B 19/4061 700/90 |
| 2003/0122793 A1* | 7/2003 | Takasu | G05B 19/042 345/173 |

(Continued)

FOREIGN PATENT DOCUMENTS

| | | | |
|---|---|---|---|
| JP | S61270048 A | 11/1986 | |
| JP | 10100045 A | 4/1998 | |

(Continued)

OTHER PUBLICATIONS

WO_2013027283_A1 (Year: 2013).*

(Continued)

*Primary Examiner* — Hien D Khuu
(74) *Attorney, Agent, or Firm* — von Briesen & Roper, s.c.

(57) ABSTRACT

[Problem] To provide a machine tool including a machine tool body including a spindle device, a feed device, and a machining auxiliary device, an additional device, a main operation panel, a sub-operation panel for manual operation of the additional device, and a controller, wherein when a predetermined abnormality occurs in the machine tool body while an operator is working at the additional device, the predetermined abnormality is quickly avoided without damaging a workpiece due to interference with a tool.
[Solution] A sub-operation panel 40 has an abnormality avoidance operation unit 43 and a controller 100 is configured to be able to, when receiving an operation signal of the abnormality avoidance operation unit 43 from the sub-operation panel 40 during automatic operation based on an NC program, implement abnormality avoidance operation of a machine tool body 1 by changing an operational status of at least one of a spindle device 17, a feed device 16, and a machining auxiliary device 18 in accordance with the operation signal without powering off the machine tool 1.

9 Claims, 6 Drawing Sheets

(56) References Cited

U.S. PATENT DOCUMENTS

| | | | | |
|---|---|---|---|---|
| 2010/0305758 A1* | 12/2010 | Nishi | ................... | G05B 19/409 |
| | | | | 318/568.14 |
| 2015/0268661 A1* | 9/2015 | Ogawa | ............... | G05B 19/4061 |
| | | | | 700/182 |
| 2024/0109129 A1* | 4/2024 | Uchiyama | .............. | B23Q 17/22 |

FOREIGN PATENT DOCUMENTS

| | | | |
|---|---|---|---|
| JP | 2001255921 | A | 9/2001 |
| JP | 2010257010 | A | 11/2010 |
| JP | 2016043462 | A | 4/2016 |
| JP | 2020062700 | A | 4/2020 |
| KR | 19990040967 | A | 6/1999 |
| WO | 2013027283 | A1 | 2/2013 |

OTHER PUBLICATIONS

JP_2015179400_A (Year: 2015).*
JP_6267026_B2 (Year: 2018).*
International Search Report for related Application No. PCT/JP2020/041226; report dated Feb. 2, 2021.
Extended European Search Report for related Application No. EP20960762.1; reported on Jul. 2, 2024.

* cited by examiner

MACHINE TOOL

TECHNICAL FIELD

The present invention relates to a machine tool including a machine tool body, an additional device attached to the machine tool body, a controller operationally controlling the machine tool body and the additional device, a main operation panel, and a sub-operation panel for manual operation of the additional device.

BACKGROUND ART

A known example of the machine tool as described above is disclosed in Japanese Unexamined Patent Application Publication No. 2016-43462 (Patent Literature 1).

This machine tool includes a tool changer that is an example of the additional device attached to the machine tool body. The machine tool body includes a machining mechanism unit and a coolant device as an auxiliary device. The machining mechanism unit includes a spindle device and a feed device. The main operation panel has an operation unit for operating the machine tool by automatic operation based on an NC program or by manual operation and inputs an operation signal of the operation unit to the controller. The sub-operation panel has an operation unit for operating the tool changer by manual operation and inputs an operation signal of the operation unit to the controller.

The tool changer includes a tool magazine, a magazine driving mechanism unit, and a tool changing mechanism unit. The tool magazine has a plurality of tool holding parts each holding a tool therein. The magazine driving mechanism unit drives the tool magazine to move each tool holding part to a tool change position. The tool changing mechanism unit changes a tool attached to a spindle of the machine tool body with the tool positioned at the tool change position.

With this tool changer, an operator can manually perform setup operations such as attachment of a tool to each tool holding part and detachment of a tool from each tool holding part. Specifically, the operator selects a tool holding part to be operated on the sub-operation panel. Thereby, an operation signal for moving the selected tool holding part to the tool attachment/detachment position is input to the controller from the sub-operation panel, so that the magazine driving mechanism unit is driven under control by the controller to move the selected tool holding part to the tool attachment/detachment position. Thus, the operator can call an intended tool holding part to the tool attachment/detachment position to perform attachment of a tool to the tool holding part or detachment of the held tool from the tool holding part.

CITATION LIST

Patent Literature

Patent Literature 1: Japanese Unexamined Patent Application Publication No. 2016-43462

SUMMARY OF INVENTION

Technical Problem

However, the machine tool disclosed in Patent Literature 1 has a problem that if an abnormal sound, an abnormal vibration, or the like (predetermined abnormality) occurs in the machine tool body while the operator is performing a tool setup operation at the tool changer (additional device), the operator cannot quickly cope with the abnormality.

Specifically, if the operator is in the vicinity of the main operation panel when a predetermined abnormality occurs, the operator can operate the main operation panel to cause the machine tool body to perform an operation for avoiding the predetermined abnormality (abnormality avoidance operation). On the other hand, if the operator is performing a setup operation at the tool changer (additional device) attached to the machine tool when a predetermined abnormality occurs, the operator has to interrupt the setup operation and move to the front of the main operation panel on the machine tool body before operating the main operation panel to cause the machine tool to carry out the abnormality avoidance operation. This lengthens the time from the occurrence of the predetermined abnormality to the start of operation of the main operation panel by the operator; in the meantime, the abnormality is enlarged.

To avoid this problem, a configuration is conceivable in which the sub-operation panel for manual operation of the additional device has an emergency stop button and, when the emergency stop button is operated, the machine tool is powered off so that the entire machine tool including the spindle device and the feed device is operationally stopped.

However, for example, in the case where the machine tool is a vertical machining center or the like, when the machine tool is powered off by the emergency stop button being operated, a carriage drivable in the direction of axis of gravity while holding a workpiece or a tool falls slightly by gravity. This can result in the workpiece interfering with the tool and being damaged by the interference. To avoid this problem, it is conceivable to, at the time of emergency stop, cause the feed device of the machine tool to perform an operation of pulling up the carriage slightly in the direction of axis of gravity. However, the operation of pulling up the carriage takes place unexpectedly by pressing of the emergency stop button. Therefore, depending on the timing of the pressing of the emergency stop button, the workpiece can interfere with the tool and be damaged by the interference.

The present invention has been achieved in view of the above-described circumstances, and an object of the invention is to provide a machine tool which is capable of, when a predetermined abnormality occurs in a machine tool body while an operator is working at an additional device, quickly avoiding the predetermined abnormality without a workpiece being damaged by interreference with a tool.

Solution to Problem

To solve the above-described problem, an aspect of the present invention provides a machine tool including:
- a machine tool body including: a spindle device having a spindle to be rotationally driven while holding a workpiece or a tool; a feed device changing a positional relationship between the workpiece and the tool; and a machining auxiliary device assisting machining of the workpiece by the tool;
- an additional device attached to the machine tool body and configured to perform a predetermined operation accompanying the machining of the workpiece;
- a controller configured to operationally control the spindle device, feed device, and machining auxiliary device of the machine tool body and operationally control the additional device;
- a main operation panel having a machine running operation unit for operating the machine tool body and the additional device by automatic operation based on an NC program or by manual operation and configured to input an operation signal of the machine running operation unit to the controller; and a sub-operation panel having a device operation unit for operating the additional device by manual operation and configured to input an operation signal of the device operation unit to the controller, wherein:

the sub-operation panel further has an abnormality avoidance operation unit for causing the machine tool body to perform an abnormality avoidance operation for avoiding a predetermined abnormality occurred in the machine tool body and is configured to input an operation signal of the abnormality avoidance operation unit to the controller; and the controller is configured to be able to, when receiving the operation signal of the abnormality avoidance operation unit from the sub-operation panel during the automatic operation based on the NC program, implement the abnormality avoidance operation by changing an operational status of at least one of the spindle device, feed device, and machining auxiliary device in accordance with the operation signal of the abnormality avoidance operation unit without powering off the machine tool.

In this machine tool, when an operator operates the machine running operation unit of the main operation panel, the operation signal of the machine running operation unit is input to the controller to cause the controller to operate the machine tool body and the additional device by automatic operation based on an NC program or by manual operation. When the operator operates the device operation unit of the sub-operation panel, the operation signal of the device operation unit is input to the controller to cause the controller to operate the additional device by manual operation.

The sub-operation panel has the abnormality avoidance operation unit in addition to the device operation unit for manual operation of the additional device. The abnormality avoidance operation unit is an operational unit for, when a predetermined abnormality (e.g., an abnormal sound or an abnormal vibration) occurs in the machine tool body, causing the machine tool body through the sub-operation panel to perform an abnormality avoidance operation. Specifically, once the operator operates the abnormality avoidance operation unit, the operation signal of the abnormality avoidance operation unit is input to the controller from the sub-operation panel. Upon receiving this operation signal, the controller changes the operational status of at least one of the spindle device, feed device, and machining auxiliary device in accordance with the received operation signal without powering off the machine tool. Therefore, even if a predetermined abnormality occurs in the machine tool body while the operator is working at the additional device, the operator can attempt to change the operational status of at least one of the spindle device, feed device, and machining auxiliary device of the machine tool body through the sub-operation panel that is provided for the purpose of manual operation of the additional device; thus, the operator can quickly cause the machine tool body to perform an abnormality avoidance operation, without moving to the main operation panel.

This machine tool is configured such that the abnormality avoidance operation is performed without powering off the machine tool. Therefore, for example, similarly to the case where the machine tool is powered off by an emergency stop button being pressed, the workpiece (or the tool) is prevented from being damaged by unintentionally moving in the direction of axis of gravity.

In the above-described machine tool, it is preferred that the abnormality avoidance operation is performed without stopping rotation of the spindle by the spindle device. This prevents rotation of the tool from being stopped with the tool cutting in the workpiece. Therefore, the workpiece is prevented from being damaged by the tool cutting in the workpiece; consequently, the workpiece reuse rate in the event of the predetermined abnormality is increased and the material cost is thereby reduced.

In the above-described machine tool, it is preferred that the abnormality avoidance operation unit includes a first operation unit for changing a rotational speed of the spindle of the machine tool body and the controller is configured to be able to, when receiving an operation signal of the first operation unit from the sub-operation panel during the automatic operation based on the NC program, implement the abnormality avoidance operation by causing the spindle device to perform an operation of changing the rotational speed of the spindle in accordance with the operation signal of the first operation unit, without powering off the machine tool and without stopping rotation of the spindle.

With this configuration, once the operator operates the first operation unit as the abnormality avoidance operation unit of the sub-operation panel while the machine tool is being operated by the automatic operation based on the NC program, the operation signal of the first operation unit is transmitted to the controller. The controller causes the spindle device to perform an operation of changing the rotational speed of the spindle in accordance with the operation signal of the first operation unit received from the sub-operation panel. This changing operation may be performed either to increase or to decrease the rotational speed of the spindle.

Therefore, for example, when an abnormal vibration as the predetermined abnormality occurs in the machine tool body, the operator can operate the first operation unit of the sub-operation panel to shift the rotational speed of the spindle from the resonance point, so that the predetermined abnormality (abnormal vibration) is avoided. In this case, the shifting of the rotational speed of the spindle from the resonance point corresponds to the abnormality avoidance operation.

In the above-described machine tool, it is preferred that the abnormality avoidance operation unit includes a second operation unit for changing a feed speed of the feed device and the controller is configured to be able to, when receiving an operation signal of the second operation unit from the sub-operation panel during the automatic operation based on the NC program, implement the abnormality avoidance operation by causing the feed device to perform an operation of changing the feed speed in accordance with the operation signal of the second operation unit, without powering off the machine tool and without stopping rotation of the spindle.

With this configuration, once the operator operates the second operation unit as the abnormality avoidance operation unit of the sub-operation panel while the machine tool is being operated by the automatic operation based on the NC program, the operation signal of the second operation unit is transmitted to the controller. The controller causes the feed device to perform an operation of changing the feed speed in accordance with the operation signal of the second operation unit received from the sub-operation panel. This changing operation may be performed either to increase or to decrease the feed speed.

Therefore, for example, when a chatter vibration between the tool and the workpiece as the predetermined abnormality occurs, the operator can operate the second operation unit of the sub-operation panel to adjust the feed speed of the feed device to such a speed that no chatter vibration occurs, so that the predetermined abnormality is avoided. In this case, the change of the feed speed of the feed device to such a speed that no chatter vibration occurs corresponds to the abnormality avoidance operation.

In the above-described machine tool, it is preferred that the abnormality avoidance operation unit includes a third operation unit for stopping feed driving of the feed device and the controller is configured to be able to, when receiving an operation signal of the third operation unit from the sub-operation panel during the automatic operation based on the NC program, implement the abnormality avoidance operation by causing the feed device to perform an operation of stopping the feed driving, without powering off the machine tool and without stopping rotation of the spindle.

With this configuration, once the operator operates the third operation unit as the abnormality avoidance operation unit of the sub-operation panel while the machine tool is being operated by the automatic operation based on the NC program, the operation signal of the third operation unit is transmitted to the controller. Upon receiving this operation signal of the third operation unit, the controller causes the feed device to perform an operation of stopping the feed driving.

Therefore, when the predetermined abnormality occurs in the machine tool body, the operator can operate the third operation unit of the sub-operation panel to stop the feed driving of the feed device, so that contact between the tool and the workpiece is prevented in advance or further progress of the machining of the workpiece is prevented with the tool and the workpiece in contact with each other. After the feed driving is stopped, some kind of operation, for example, stopping a device in which a failure may occur, can be performed to avoid the abnormality. In this case, the stop of the feed driving corresponds to the abnormality avoidance operation for avoiding the abnormality.

In the above-described machine tool, it is preferred that the abnormality avoidance operation unit includes a fourth operation unit for causing the feed device to perform an operation of changing a positional relationship between the workpiece and the tool and the controller is configured to be able to, when receiving an operation signal of the fourth operation unit from the sub-operation panel during the automatic operation based on the NC program, implement the abnormality avoidance operation by operating the feed device in accordance with the operation signal of the fourth operation unit without powering off the machine tool and without stopping rotation of the spindle.

With this configuration, once the operator operates the fourth operation unit as the abnormality avoidance operation unit of the sub-operation panel while the machine tool is being operated by the automatic operation based on the NC program, the operation signal of the fourth operation unit is transmitted to the controller. Upon receiving this operation signal of the fourth operation unit, the controller operates the feed device in accordance with the operation signal. Therefore, when the predetermined abnormality occurs in the machine tool body, the operator can operate the fourth operation unit of the sub-operation panel to cause the feed device to separate the tool and the workpiece, without stopping rotation of the spindle. Operating the fourth operation unit enables contact between the tool and the workpiece to be released; therefore, a predetermined abnormality such as a chatter vibration between the workpiece and the tool is quickly avoided. In this case, the separation of the tool and the workpiece by the feed device corresponds to the abnormality avoidance operation.

It is preferred that: the machining auxiliary device is a coolant device discharging a coolant toward the tool or the workpiece; the abnormality avoidance operation unit includes a fifth operation unit for changing an operational status of the coolant device; and the controller is configured to be able to, when receiving an operation signal of the fifth operation unit from the sub-operation panel during the automatic operation based on the NC program, implement the abnormality avoidance operation by changing the operational status of the coolant device as the machining auxiliary device in accordance with the operation signal of the fifth operation unit without powering off the machine tool and without stopping rotation of the spindle.

With this configuration, once the operator operates the fifth operation unit as the abnormality avoidance operation unit of the sub-operation panel while the machine tool is being operated by the automatic operation based on the NC program, the operation signal of the fifth operation unit is transmitted to the controller. Upon receiving this operation signal of the fifth operation unit, the controller changes the operational status of the coolant device as the machining auxiliary device in accordance with the operation signal of the fifth operation unit. Examples of the change of the operational status of the coolant device include switching on/off the coolant device and changing a coolant discharge pressure. Changing the operational status of the coolant enables a predetermined abnormality caused by heat generation of the tool or poor chip discharge property (i.e., an abnormal vibration, an abnormal sound, or the like caused by poor cutting) to be avoided. In this case, the change of the operational status of the coolant corresponds to the abnormality avoidance operation.

In the above-described machine tool, it is preferred that the sub-operation panel has a setting operation unit for setting a priority operation mode and the controller is configured to determine via the setting operation unit of the sub-operation panel whether the priority operation mode is set or not and, if simultaneously receiving the operation signal of the abnormality avoidance operation unit from the sub-operation panel and an operation signal from the main operation panel incompatible with the operation signal of the abnormality avoidance operation unit when it is determined that the priority operation mode is set, ignore the operation signal from the main operation panel.

With this configuration, if simultaneously receiving the operation signal of the abnormality avoidance operation unit from the sub-operation panel and an operation signal from the main operation panel incompatible with the operation signal of the abnormality avoidance operation unit when the priority operation mode is set in the sub-operation panel, the controller ignores the operation signal from the main operation panel. Consequently, the controller causes the machine tool to perform the abnormality avoidance operation in accordance with the operation signal of the abnormality avoidance operation unit from the sub-operation panel. Therefore, setting the priority operation mode through the setting operation unit of the sub-operation panel when the operator works at the additional device enables, when the predetermined abnormality occurs in the machine tool body, the operator to quickly cause the machine tool body through the abnormality avoidance operation unit of the sub-operation panel to perform the abnormality avoidance operation, without being disturbed by an operation performed in the main operation panel.

In the thus-configured machine tool, it is preferred that the main operation panel has a display unit for displaying information thereon and the controller is configured to, when determining that the priority operation mode is set in the sub-operation panel, display on the display unit an indication that the priority operation mode is set in the sub-operation panel.

With this configuration, when the priority operation mode is set in the sub-operation panel, this (an indication that the priority operation mode is set in the sub-operation panel) is displayed on the display unit of the main operation panel under control by the controller. Displaying on the display unit of the main operation panel the indication that the priority operation mode is set in the sub-operation panel enables the operator whose operation in the main operation panel is ignored to easily and infer by looking at the displayed identification that priority may be given to an operation performed in the sub-operation panel.

Advantageous Effects of Invention

As described above, the machine tool according to the present invention is configured such that the sub-operation panel for operation of the additional device has the abnormality avoidance operation unit and, when the abnormality avoidance operation unit is operated, the controller causes the machine tool body to carry out the abnormality avoidance operation by changing the operational status of at least one of the spindle device, feed device, and machining auxiliary device in accordance with the operation signal of the abnormality avoidance operation unit received from the sub-operation panel, without powering off the machine tool. Therefore, if a predetermined abnormality occurs in the machine tool body while an operator is working at the additional device, the operator can quickly avoid the predetermined abnormality without the workpiece being damaged by interference with the tool.

DESCRIPTION OF EMBODIMENTS

Embodiment

Hereinafter, a specific embodiment of the present invention will be described with reference to the drawings.

Figure 1:
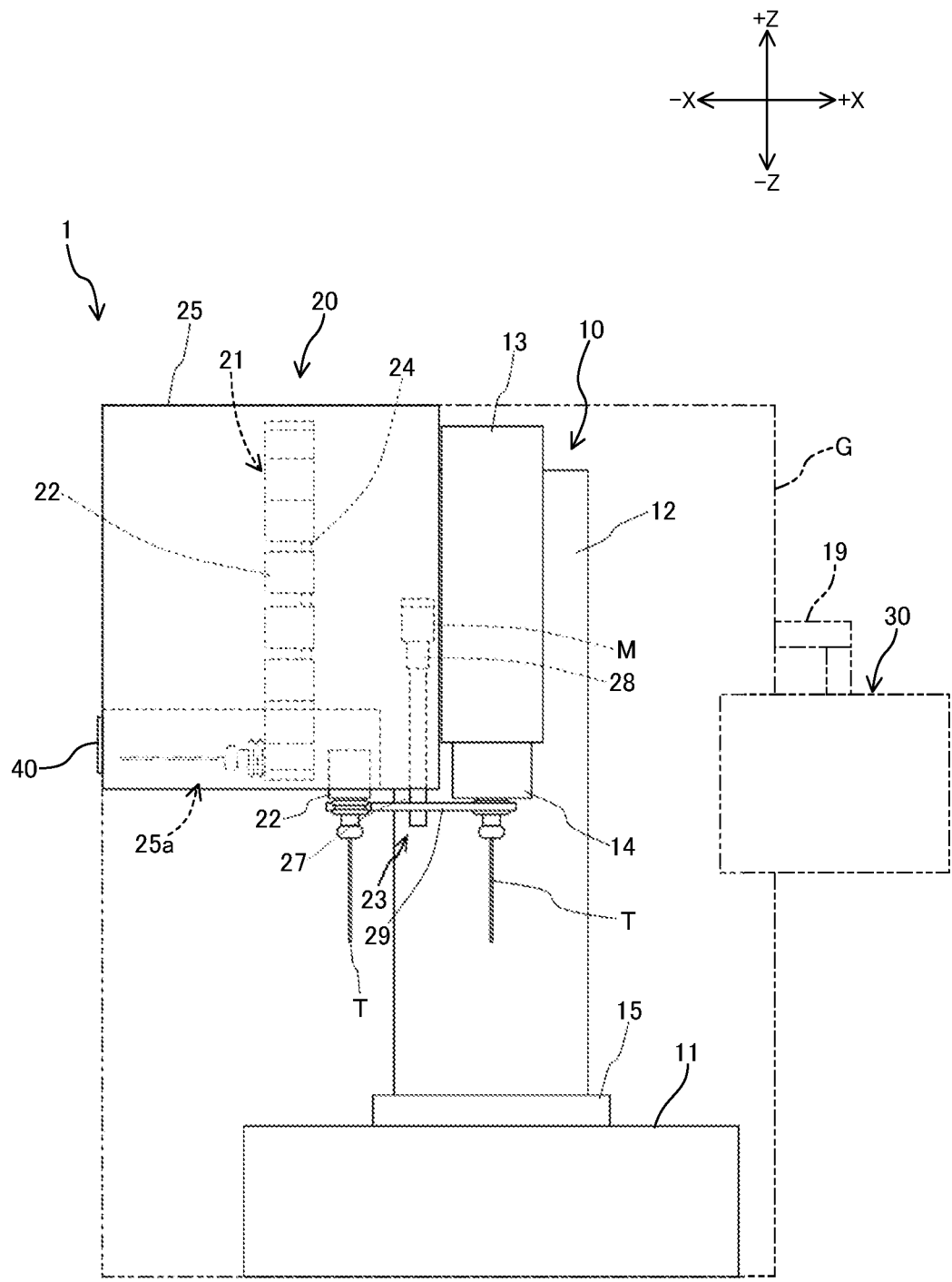
FIG. 1 is a front view illustrating a machine tool according to an embodiment.
Figure 2:
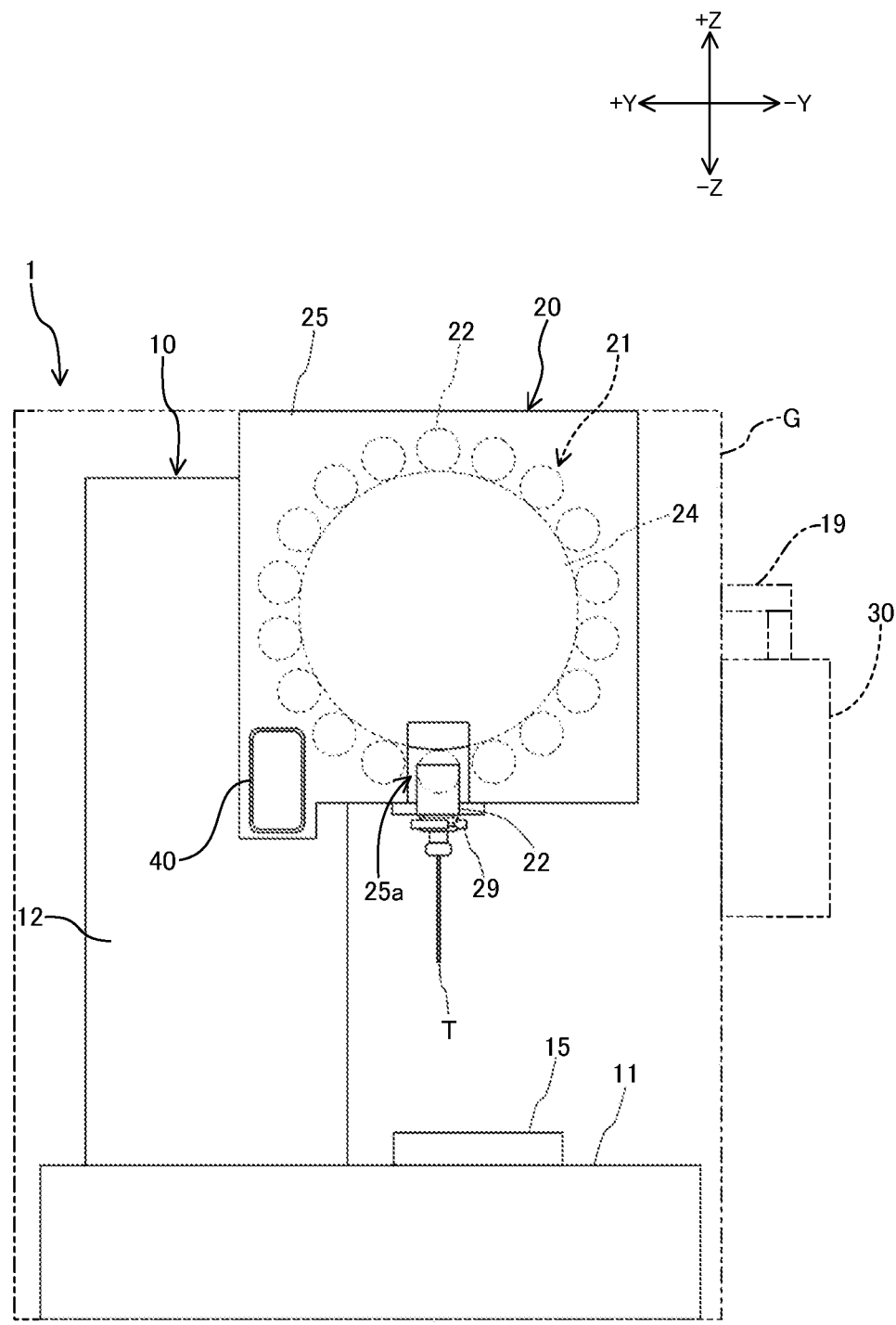
FIG. 2 is a side view of the machine tool according to the embodiment as viewed from the left side in FIG. 1.
Figure 3:
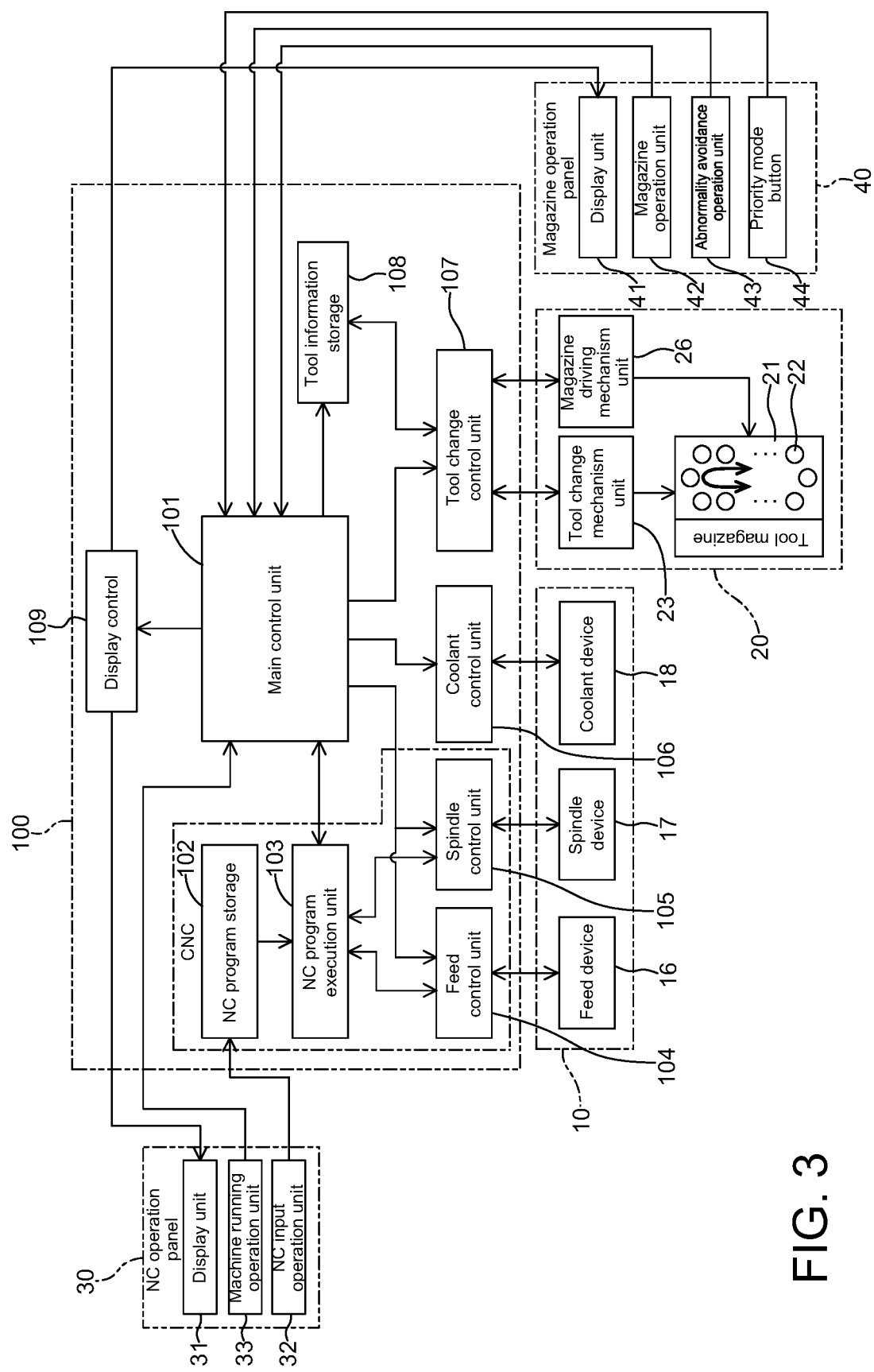
FIG. 3 is a block diagram illustrating a control system of the machine tool according to the embodiment.

As illustrated in FIGS. 1 and 2, a machine tool 1 according to this embodiment is a vertical machining center that includes a machine tool body 10, a tool changer an NC operation panel 30, a magazine operation panel 40, and a controller 100 (see FIG. 3).

The machine tool 1 further has a splash guard G that defines a machining area for machining of a workpiece and forms the external shape of the machining area. An openable and closable door (not illustrated) for providing access to the machining area is attached to the splash guard G at the machine front side (the front side in the direction perpendicular to the paper surface of FIG. 1), and the door is slidable in an X-axis direction. The NC operation panel 30 is arranged on the right side in front of the machine tool 1 and supported by the machine tool body 10 via a support arm 19. An operator can automatically or manually operate the machine tool 1 through the NC operation panel 30. The magazine operation panel 40 is arranged on the left side (the left side as viewed from the front side) of the machine tool 1. The operator can manually operate the tool changer 20 through the magazine operation panel 40. The NC operation panel 30 and the magazine operation panel 40 are described in detail later.

The machine tool body 10 includes a bed 11, a column 12 erected on the bed 11, a spindle head 13 supported by the column 12 and movable in a vertical direction (Z-axis direction), a spindle device 17 (see FIGS. 1 and 3) including a spindle 14 supported by the spindle head 13 to be rotatable about an axis thereof, a table 15 disposed on the bed 11 below the spindle 14, a feed device 16 driving the spindle head 13 and the table 15, and a coolant device 18.

The table 15 is configured to be movable in the X-axis direction and a Y-axis direction that are horizontal and orthogonal to each other. The spindle head 13 is configured to be movable in the Z-axis direction that is a vertical direction orthogonal to the X-axis and the Y-axis.

The feed device 16 drives the table 15 in the X-axis and Y-axis directions and drives the spindle head 13 in the Z-axis direction. Thus, the feed device 16 is able to change a positional relationship (relative positional relationship) between a workpiece set on the table and a tool T attached to the spindle 14 supported by the spindle head 13 in a three-dimensional space. The feed device 16 is constituted by, for example, three servo motors and a ball screw mechanism. The servo motors rotate their respective output shafts about the X-axis, the Y-axis, and the Z-axis, respectively. The ball screw mechanism converts rotational motions of the servo motors into linear motions in their respective axal directions.

The spindle device 17 has the spindle 14 and a spindle motor (not illustrated). The spindle motor rotationally drives the spindle 14 about the axis thereof (i.e., about the Z-axis). The spindle motor is composed of, for example, a servo motor.

The coolant device 18 sprays a coolant to the vicinity of a distal end of the tool T during machining of the workpiece so that heat generation of the tool T is suppressed and discharge of chips is facilitated. The coolant device 18 has, for example, a flexible nozzle and a coolant pump. The flexible nozzle is fixed to the spindle head 13 via a manifold. The coolant pump pumps up a coolant in a coolant tank and supplies the coolant to the manifold.

The tool changer 20 includes a tool magazine 21 and a tool changing mechanism unit 23. The tool magazine 21 is disposed beside the spindle head 13. The tool changing mechanism unit 23 is arranged at the lower end of the tool magazine 21 and changes the tool T attached to the spindle 14 with a tool T stored in a tool pot 22 in the tool magazine 21. The tool changer 20 corresponds to the additional device that is attached to the machine tool body 10 and performs a predetermined operation (in this example, a tool change operation).

The tool magazine 21 is constituted by a plurality of tool pots (tool holding parts) 22, a disk-shaped holding plate 24, and a cover 25. The tool pots 22 each holds a tool T. The holding plate 24 holds the tool pots 22 with the tool pots 22 arranged at predetermined intervals on the outer periphery of the holding plate 24. The cover 25 is arranged to surround the tool pots 22 and the holding plate 24 and has an opening 25a formed in a bottom portion thereof. The holding plate 24 is rotationally driven about the center axis thereof by a magazine driving mechanism unit 26. The holding plate 24 is rotated by the magazine driving mechanism unit 26 so as to transfer a desired one of the tool pots 22 held by the holding plate 24 to the opening 25a of the cover 25. The position where the opening 25a is formed is hereinafter referred to as "attachment/detachment position". The tool pots 22 in this embodiment are arranged in a circular shape as illustrated in FIGS. 1 and 2. Note that the tool pots 22 illustrated in FIG. 3, which is described later, are arranged not in a circular shape but in an elliptical shape for the sake of convenience in illustration.

The tool pot 22 indexed to the attachment/detachment position is turned appropriately within a vertical plane by a turning mechanism (not illustrated) so that the tool pot 22 is moved to a standby position at which the tool pot 22 is in a posture parallel to the spindle 14. By being turned within the vertical plane again by the turning mechanism, the tool pot 22 at the standby position is returned to the attachment/detachment position (refer to the dashed and double-dotted line in FIG. 1).

As illustrated in FIG. 1, the tool changing mechanism unit 23 includes a rotary shaft 27, a drive motor M, and a change arm 29. The rotary shaft 27 is arranged at an intermediate position between the spindle 14 and the tool pot 22 at the standby position such that an axis thereof is parallel to the axis of the spindle 14. The drive motor M rotates the rotary shaft 27 about the axis thereof via a cam mechanism 28. The change arm 29 has gripping portions formed at both ends thereof and is fixed to a lower end portion of the rotary shaft 27. The gripping portions are each able to grip a tool T.

The rotary shaft 27 is rotated about the axis thereof and moved up and down in the axial direction thereof by a rotational driving force being transmitted from the driving motor M to the cam mechanism 28. The change arm 29 rotates and moves up and down along with the rotary shaft 27, thereby changing the tool T attached to the spindle 14 with the tool T held by the tool pot 22 at the standby position.

[Configuration of Controller]

As illustrated in FIG. 3, the controller 100 has a main control unit 101, an NC program storage 102, an NC program execution unit 103, a feed control unit 104, a spindle control unit 105, a coolant control unit 106, a tool change control unit 107, a tool information storage 108, and a display control unit 109.

The NC program storage 102, the NC program execution unit 103, the feed control unit 104, and the spindle control unit 105 are implemented by, for example, a CNC unit (computerized numerical control unit). The main control unit 101 is implemented by, for example, a PLC unit (programmable logic controller unit).

The NC operation panel 30 (an example of the main operation panel) and the magazine operation panel 40 (an example of the sub-operation panel) are connected to the controller 100. The controller 100, the NC operation panel 30, and the magazine operation panel 40 are composed of a computer including a CPU, a RAM, and a ROM. Hereinafter, the function of a control system for operation of the NC operation panel 30 is first described, and then the function of a control system for operation of the magazine operation panel 40 is described.

[Description of Function of Control System for Operation of NC Operation Panel]

Figure 4:
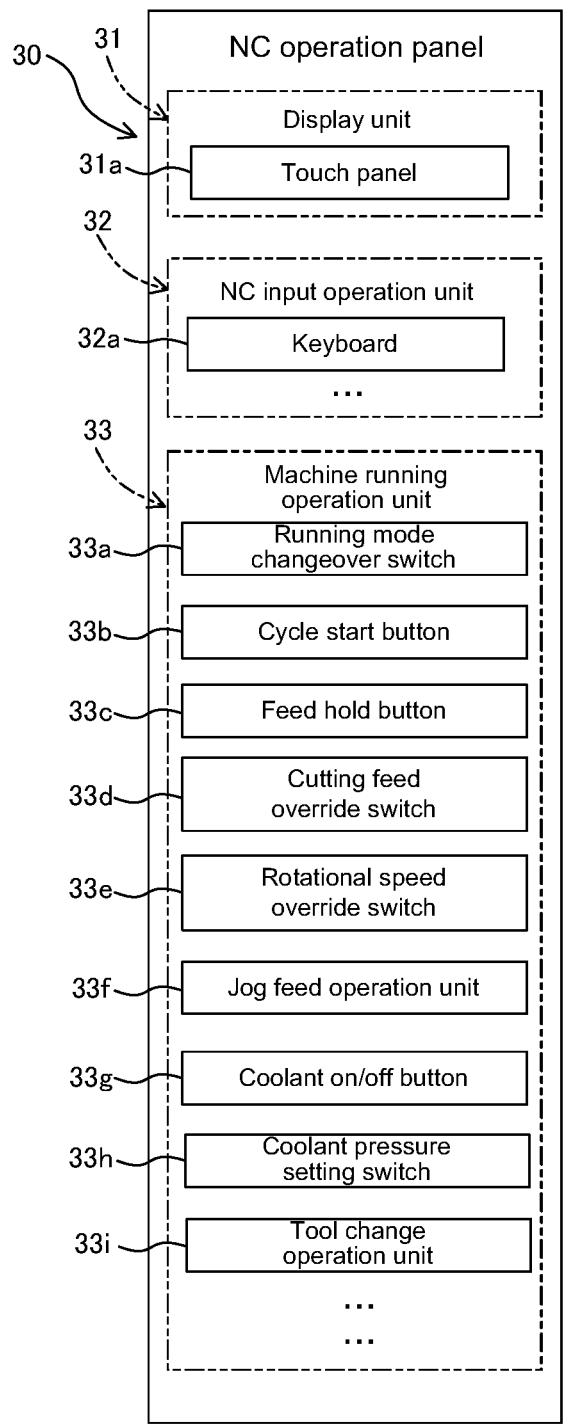
FIG. 4 is a block diagram illustrating a configuration of an NC operation panel.

As illustrated in FIGS. 3 and 4, the NC operation panel 30 has a display unit 31, an NC input operation unit 32, and a machine running operation unit 33.

The display unit 31 is composed of, for example, a touch panel 31a. The display unit 31 is able to display an NC program stored in the NC program storage 102, an execution status in the NC program execution unit 103, and operational statuses of the feed device 16 and spindle device 17.

The NC input operation unit 32 has a keyboard 32a. An operator can operate the keyboard 32a with his/her fingers to perform a processing of storing the NC program into the NC program storage 102 and a processing of storing tool information and the like into the tool information storage 108 via the main control unit 101. The tool information contains information on correspondence between the number of each tool pot 22 of the tool magazine 21 and the tool number of the tool T attached to each tool pot 22.

The machine running operation unit 33 is an operational unit for operating the machine tool 1 by automatic operation or by manual operation. Specifically, as illustrated in FIG. 4, the machine running operation unit 33 has a running mode changeover switch 33a, a cycle start button 33b, a feed hold button 33c, a cutting feed override switch 33d, a rotational speed override switch 33e, a jog feed operation unit 33f, a coolant on/off button 33g, a coolant pressure setting switch 33h, and a tool change operation unit 33i. The machine running operation unit 33 further has a well-known manual pulse handle (manual pulse generator) and an emergency stop button for powering off the machine tool 1.

The running mode changeover switch 33a is a switch for switching the machine tool 1 between an automatic operation mode and a manual operation mode. The automatic operation mode is a mode for causing the machine tool 1 to automatically operate in accordance with the NC program stored in the NC program storage 102. The manual operation mode is a mode for operating the devices of the machine tool 1 by the operator's manual operation.

The cycle start button 33b is a button for, in the automatic operation mode, causing the machine tool 1 to start to automatically operate in accordance with the NC program.

The feed hold button 33c is a button for switching the machine tool 1 automatically operating in accordance with the NC program into a feed hold state. In the feed hold state, feeding operation of the feed device 16 is stopped while rotation of the spindle 14 by the spindle device 17 and operation of the coolant device 18 continue. When the cycle start button 33b is pressed while the machine tool 1 is in the feed hold state, the interrupted automatic operation of the machine tool 1 is resumed.

The cutting feed override switch 33d is a switch for adjusting a feed speed of the feed device 16 during the automatic operation of the machine tool 1. The cutting feed override switch 33d is composed of, for example, a rotary adjustment dial and is configured to be able to specify a speed magnification rate, for example, in the range of 0% to 200%, relative to the feed speed specified in the NC program. Note that setting the cutting feed override switch 33d to 0% implements a machine operation equivalent to that implemented by pressing the feed hold button 33c.

The rotational speed override switch 33e is a switch for adjusting a rotational speed of the spindle 14 during the automatic operation of the machine tool 1. The rotational speed override switch 33e is composed of, for example, a rotary adjustment dial and is configured to be able to specify a speed magnification rate, for example, in the range of 0% to 200%, relative to the rotational speed of the spindle 14 specified in the NC program.

The jog feed operation unit 33f is an operational unit for moving the spindle head 13 and the table 15 by jog feed. For example, the jog feed operation unit 33f has six keys for inputting the jog feed direction, namely, the X-axis plus, the X-axis minus, the Y-axis plus, the Y-axis minus, the Z-axis plus, or the Z-axis minus.

The coolant on/off button 33g is a button for manually switching on/off the coolant device 18. In this example, the coolant device 18 is alternately switched between an ON state and an OFF state each time the coolant on/off button 33g is pressed.

The coolant pressure setting switch 33h is a switch for setting a coolant discharge pressure of the coolant device 18. The coolant pressure setting switch 33h is composed of, for example, a rotary dial and is configured to able to specify a magnification rate in the range of 0% to 100% relative to the maximum coolant discharge pressure of the coolant device 18.

The tool change operation unit 33i is an operational unit for performing an operation of calling a tool pot 22 to be operated to the tool attachment/detachment position by rotating the tool magazine 21 and an operation of changing the tool T attached to the spindle 14 with the tool T attached to the called tool pot 22 by the tool changing mechanism unit 23. The tool change operation unit 33i has a tool call key for inputting the number of the tool pot 22 to be called to the attachment/detachment position and an actuation button for actuating the tool changing mechanism unit 23 (both are not illustrated).

The main control unit 101 carries out a predetermined processing in accordance with a sequence program previously stored in the ROM on the basis of operation signals input from the NC operation panel 30 and the magazine operation panel 40, which is described later, or on the basis of commands input from the NC program execution unit 103, which is described below.

For example, once the cycle start button 33b is operated in the NC operation panel 30 when the machine tool 1 is in the automatic operation mode, the main control unit 101 sends an execution command to the NC program execution unit 103 in response to the operation signal input from the NC operation panel 30 to cause the NC program execution unit 103 to execute the NC program. Upon receiving the execution command from the main control unit 101, the NC program execution unit 103 reads the NC program stored in the NC program storage 102 block by block (row by row) and interprets the command (NC code) in each block (row). Commands for operation of the feed device 16 and operation of the spindle device 17 are respectively transmitted to the feed control unit 104 and the spindle control unit 105, so that the feed device 16 and the spindle device 17 are operated by the feed control unit 104 and the spindle control unit 105. Commands for the other devices (a coolant discharge command, a tool change command, and the like) are transmitted to the main control unit 101.

Upon receiving a coolant operation command defined in the NC program while the NC program execution unit 103 is executing the NC program, the main control unit 101 sends a command (an on/off command or the like) to the coolant control unit 106 to cause the coolant control unit 106 to perform the operation. Upon receiving a tool change command defined in the NC program while the NC program execution unit 103 is executing the NC program, the main control unit 101 send a command to the tool change control unit 107 to cause the tool change control unit 107 to perform the tool change operation. Thus, the main control unit 101 implements the automatic operation of the machine tool 1 in cooperation with the NC program execution unit 103.

Upon receiving an operation signal of the feed hold button 33c from the NC operation panel 30 while the machine tool 1 is automatically operating, the main control unit 101 sends a feed hold command to the NC program execution unit 103 to switch the machine tool 1 into the feed hold state. Upon receiving the feed hold command from the main control unit 101 while executing the NC program, the NC program execution unit 103 interrupts the execution of the NC program and sends a stop command to the feed control unit 104 to cause the feed control unit 104 to stop the feed operation. Simultaneously, the NC program execution unit 103 sends an operation command to the spindle control unit 105 to cause the spindle control unit 105 to maintain rotation of the spindle 14 and sends a command to the coolant control unit 106 to cause the coolant control unit 106 to continue discharge of coolant. Thereby, the machine tool 1 is brought into the feed hold state in which the feed operation is stopped while the spindle 14 is being rotated.

On the other hand, upon receiving an operation signal of the jog feed operation unit 33f from the NC operation panel 30 when the machine tool 1 is in the manual operation mode, the main control unit 101 transmits a jog feed command to the feed control unit 104 to cause the feed device 16 to perform the jog feed operation.

Upon receiving an operation signal of the coolant on/off button 33g from the NC operation panel 30 when the machine tool 1 is in the manual operation mode, the main control unit 101 sends a command to the coolant control unit 106 to cause the coolant control unit 106 to switch on or off the coolant device 18.

Upon receiving an operation signal of the coolant pressure setting switch 33h from the NC operation panel 30 when the machine tool 1 is in the manual operation mode, the main control unit 101 sends a command to the coolant control unit 106 to cause the coolant control unit 106 to operate the coolant device 18 with a coolant discharge pressure corresponding to the received operation signal.

Upon receiving an operation signal of the tool change operation unit 33i when the machine tool 1 is in the manual operation mode, the main control unit 101 sends a command to the tool change control unit 107 to cause the tool change control unit 107 to perform the tool calling operation and the tool changing operation in accordance with the operation signal.

Further, the main control unit 101 sends a command to the display control unit 109 as appropriate in response to a received operation signal or a command from the NC program execution unit 103 to cause the display control unit 109 to change the contents displayed on the display unit 31 of the NC operation panel 30 or the contents displayed on a display unit 41 of the magazine operation panel 40.

The main control unit 101 determines a cutting feed override value and a rotational speed override value for the spindle 14 during the automatic operation of the machine tool 1 in accordance with the NC program based on specified values (operation signals) of the cutting feed override switch 33d and rotational speed override switch 33e of the NC operation panel 30 and specified values (operation signals) of a cutting feed override switch 43b and a rotational speed override switch 43c, which are described later, of the magazine operation panel 40. The main control unit 101 transmits the determined values respectively to the feed control unit 104 and the spindle control unit 105. The determination of each override value is described in detail later.

The feed control unit 104 is a functional unit that controls operation of the feed device 16. Upon receiving the operation command from the NC program execution unit 103 when the machine tool 1 is in the automatic operation mode, the feed control unit 104 calculates a target feed speed in each axis direction by multiplying the feed speed (in each axis direction) of the feed device 16 defined in the NC program and the cutting feed override value received from the main control unit 101, and operates the feed device 16 with the calculated target feed speed.

Upon receiving the jog feed command from the main control unit 101 when the machine tool 1 is in the manual operation mode, the feed control unit 104 operates the feed device 16 with a preset target jog feed speed in each axis direction.

The spindle control unit 105 is a functional unit that controls operation of the spindle device 17. Upon receiving the operation command from the NC program execution unit 103 when the machine tool 1 is in the automatic operation mode, the spindle control unit 105 calculates a target rotational speed of the spindle 14 by multiplying the rotational speed of the spindle 14 defined in the NC program and the rotational speed override value received from the main control unit 101, and operates the spindle device 17 (specifically, the spindle motor of the spindle device 17) such that the spindle 14 rotates at the calculated target rotational speed.

The coolant control unit 106 is a functional unit that controls operation of the coolant device 18. The coolant control unit 106 outputs to the coolant device 18 (specifically, a pump drive motor of the coolant device 18) a driving signal corresponding to an actuation command, a stop command, or a discharge pressure change command for the coolant device 18 received from the main control unit 101.

The tool change control unit 107 is a functional unit that controls operation of the tool changer 20. The tool change control unit 107 drives and controls the magazine driving mechanical unit 26 in accordance with the tool change command received from the main control unit 101 to move the tool pot 22 holding the tool T corresponding to the tool change command to the standby position, and drives and controls the tool changing mechanism unit 23 to cause the tool changing mechanism unit 23 to perform the tool changing operation.

[Description of Function of Control System for Operation of Magazine Operation Panel]

Figure 5:
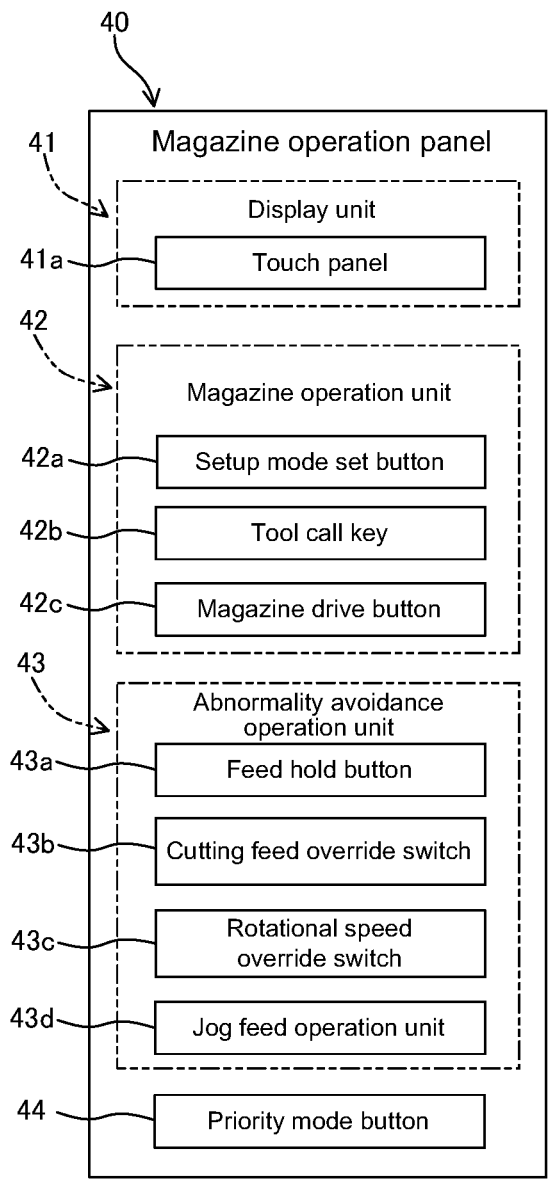
FIG. 5 is a block diagram illustrating a configuration of a magazine operation panel.

As illustrated in FIGS. 3 and 5, the magazine operation panel 40 has a display unit 41, a magazine operation unit 42, an abnormality avoidance operation unit 43, and a priority mode button 44. The magazine operation panel 40 is arranged such that an operation surface thereof is exposed to the outside of the splash guard G (see FIGS. 1 and 2). The magazine operation panel 40 is arranged on the left side of the opening 25a of the cover 25 covering the tool magazine 21 in FIG. 2. The position on the paper surface side of opening 25a in FIG. 2 functions as an operation position where the operator performs the attachment/detachment of tools T. The magazine operation panel 40 is arranged adjacent to this operation position.

The display unit 41 is composed of, for example, a touch panel 41a and displays the tool information and the like stored in the tool information storage 108.

The magazine operation unit 42 (an example of the device operation unit) has a setup mode set button 42a, a tool call key 42b, and a magazine drive button 42c. The setup mode set button 42a is a switch for selectively switching the tool changer between a normal operation mode and a setup mode. In this embodiment, the tool changer 20 is alternately switched between the normal operation mode and the setup mode each time the setup mode setting button 42a is pressed. The tool call key 42b is a key for inputting the tool number of the tool T to be called when the tool changer 20 is in the setup mode. The magazine drive button 42c is a button for confirming the input through the tool call key 42b and driving the tool magazine 21.

The normal operation mode is a mode for causing the tool changer 20 to automatically operate in cooperation with the machine tool body 10 in accordance with the NC program. The setup mode is a mode for the operator to manually operate the tool changer 20 to set up tools T. When the setup mode is set, edit of the tool information through the NC operation panel 30 and driving of the tool changer 20 are disabled, while manual operation of the tool changer 20 through the magazine operation panel 40 is enabled.

Specifically, once the magazine drive button 42c is pressed when the tool changer 20 is in the setup mode, the main control unit 101 sends a command to the tool change control unit 107 to cause the tool change control unit 107 to move the tool pot 22 corresponding to the tool number specified by the tool call key 42b to the tool attachment/detachment position. Upon receiving this command, the tool change control unit 107 drives and controls the magazine driving mechanism unit 26 to cause the tool magazine 21 to perform the tool calling operation.

The abnormality avoidance operation unit 43 is an operational unit for, when a predetermined abnormality (an abnormal vibration, an abnormal sound, or the like) occurs in the machine tool body 10, causing the machine tool body 10 to perform an abnormality avoidance operation for avoiding the predetermined abnormality without powering off the machine tool 1.

Specifically, the abnormality avoidance operation unit 43 has a feed hold button 43a, a cutting feed override switch 43b, a rotational speed override switch 43c, and a jog feed operation unit 43d.

The feed hold button 43a is a button for stopping feed driving of the feed device 16 and switching the machine tool 1 into the feed hold state through the magazine operation panel 40 while the machine tool 1 is automatically operating in accordance with the NC program. The definition of the feed hold state has been described and therefore detail description of the feed hold state is omitted here. The feed hold button 43a functions as the third operation unit for stopping the feed driving of the feed device 16.

The cutting feed override switch 43b is a switch for adjusting the feed speed of the feed device 16 during the automatic operation of the machine tool 1 in accordance with the NC program through the magazine operation panel 40. The cutting feed override switch 43b is composed of, for example, a rotary adjustment dial and is configured to be able to specify a speed magnification rate, for example, in the range of 0% to 200%, relative to the feed speed specified in the NC program. Note that setting the cutting feed override switch 43d to 0% implements a machine operation equivalent to that implemented by pressing the feed hold button 33c. Thus, the cutting feed override switch 43b functions as the third operation unit or as the second operation unit for changing the feed speed of the feed device 16.

The rotational speed override switch 43c is a switch for adjusting the rotational speed of the spindle 14 during the automatic operation of the machine tool 1 in accordance with the NC program through the magazine operation panel 40. The rotational speed override switch 43c is composed of, for example, a rotary adjustment dial. Differently from the rotational speed override switch 33e in the NC operation panel 30, the adjustment range of the rotational speed override switch 43c is, for example, 50% to 100%. Although the lower limit value is 50% by way of example, the lower limit value is not limited to 50% and, for example, may exceed 50% or fall below 50% to the extent that the spindle 14 is not stopped by a cutting resistance from the workpiece. The rotational speed override switch 43c functions as the first operation unit for changing the rotational speed of the spindle 14.

The jog feed operation unit 43d is an operational unit for driving the spindle head 13 and table 15 of the machine tool body 10 by jog feed through the magazine operation panel 40. For example, the jog feed operation unit 43d has six keys for inputting the jog feed direction, namely, the X-axis plus, the X-axis minus, the Y-axis plus, the Y-axis minus, the Z-axis plus, or the Z-axis minus. In this embodiment, once the jog feed operation unit 43d is pressed while the machine tool 1 is automatically operating in accordance with the NC program, the automatic operation of the machine tool 1 is interrupted and operation of the jog feed operation unit 43d is automatically enabled. The jog feed operation unit 43d functions as the fourth operation unit for causing the feed device 16 to perform an operation of changing the positional relationship between the workpiece and the tool T.

The priority mode button 44 (an example of the setting operation unit) is a button for setting the magazine operation panel 40 to a priority operation mode. In this embodiment, the priority operation mode is alternately activated and deactivated each time the priority mode button 44 is pressed. The priority operation mode is a mode for enabling operation of the abnormality avoidance operation unit 43 of the magazine operation panel 40 and, if an operation in the abnormality avoidance operation unit 43 of the magazine operation panel 40 and an operation in the NC operation panel 30 which is incompatible with the operation in the abnormality avoidance operation unit 43 are simultaneously performed, giving priority to the operation in the magazine operation panel 40. Examples of the case where such incompatible operations are simultaneously performed include a case where different override values are selected simultaneously in the NC operation panel 30 and the magazine operation panel 40 and a case where different jog feed directions are selected simultaneously in the NC operation panel 30 and the magazine operation panel 40. In this embodiment, an operation in the NC operation panel 30 which is not an incompatible operation as described above is carried out, even when the priority operation mode is set in the magazine operation panel 40.

The main control unit 101 first determines, based on an operation signal of the priority mode button 44 from the magazine operation panel 40, whether the magazine operation panel 40 is currently set in the priority operation mode or not.

When determining that the magazine operation panel 40 is set in the priority operation mode, the main control unit 101 displays on the display unit 31 of the NC operation panel 30 a message like "The priority operation mode is set in the magazine operation panel. In the event of incompatible operations, the magazine operation panel is given priority.". Note that the message to be displayed is not limited to this message and may be any message as long as it gives a notice that the priority operation mode is set in the magazine operation panel 40.

Upon receiving an operation signal of the abnormality avoidance operation unit 43 of the magazine operation panel 40 when it is determined that the priority operation mode is set in the magazine operation panel 40, the main control unit 101 operationally control the machine tool 1 in accordance with the operation signal.

Specifically, upon receiving an operation signal of the feed hold button 43a from the magazine operation panel 40 when it is determined that the priority operation mode is set, the main control unit 101 sends the feed hold command to the NC program execution unit 103 and continues to send the coolant discharge command to the coolant control unit 106. Upon receiving the feed hold command from the main control unit 101, the NC program execution unit 103 interrupts the execution of the NC program and send the command to the spindle control unit 105 to cause the spindle control unit 105 to maintain rotation of the spindle 14, similarly to when the feed hold button 33c of the NC operation panel 30 is pressed. Thereby, the machine tool 1 is brought into the above-described feed hold state.

Upon receiving an operation signal of the jog feed operation unit 43d from the magazine operation panel 40 when it is determined that the priority operation mode is set, the main control unit 101 operates the feed device 16 with the preset target jog feed speed via the feed control unit 104. If the jog feed operation unit 43d of the magazine operation panel 40 is operated while the machine tool 1 is automatically operating in accordance with the NC program, the main control unit 101 sends the feed hold command to the NC program execution unit 103 and then causes the feed device 16 to perform the jog feed operation in accordance with the operation signal of the jog feed operation unit 43d.

On the other hand, when determining that the priority operation mode is not set in the magazine operation panel 40 (determining that the priority operation mode is deactivated), the main control unit 101 operates as follows: when receiving an operation signal of the abnormality avoidance operation unit 43 from the magazine operation panel 40, the main control unit 101 ignores this operation signal so that the operation of the abnormality avoidance operation unit 43 is disabled; and when receiving an operation signal from the NC operation panel 30, the main control unit 101 performs the predetermined processing corresponding to the received operation signal as described in the foregoing subsection "Description of Function of Control System for Operation of NC Operation Panel".

[Override Value Determination Process in Main Control Unit]

Next, an override value determination process to be carried out in the main control unit 101 along with activation/deactivation of the priority operation mode.

When the priority operation mode is not set in the magazine operation panel the main control unit 101 determines that the current cutting feed override value is the specified value of the cutting feed override switch 33d of the NC operation panel 30 and determines that the current rotational speed override value is the specified value of the rotational speed override switch 33e of the NC operation panel 30.

The main control unit 101 maintains the determined override values (cutting feed override value and rotational speed override value) based on the operations in the NC operation panel 30 unless the cutting feed override switch 43b or rotational speed override switch 43c of the magazine operation panel 40 is operated, even after the magazine operation panel 40 is switched into the priority operation mode.

When at least one of the cutting feed override switch 43b and rotational speed override switch 43c in the magazine operation panel 40 is operated after the magazine operation panel 40 is switched into the priority operation mode, the main control unit 101 changes (updates) the corresponding override value with the specified value of the override switch 43b, 43c changed by the operation.

When the priority operation mode is deactivated after the override values are changed (updated) through the override switches 43b and 43c of the magazine operation panel 40 in the priority operation mode, the main control unit 101 maintains the current override values unless the override switches 33d and 33e of the NC operation panel 30 are newly operated. When the override switch 33d, 33e of the NC operation panel 30 is newly operated, the main control unit 101 changes (updates) the corresponding override value with the new specified value of the override switch 33d, 33e. The change of the override values through the NC operation panel 30 can be carried out also when the priority operation mode is set.

An actual operation example is described. When the priority operation mode is activated and the rotational speed override switch 43c of the magazine operation panel 40 is changed to the position of 40% in the state where the rotational speed override switch 33e of the NC operation panel 30 is positioned at the position of 100%, the rotational speed override value is determined as 40% by the main control unit 101. When the rotational speed override switch 33e of the NC operation panel is thereafter changed from the position of 100% to the position of 90%, the rotational speed override value is determined as 90% by the main control unit 101. Although this is an example of the procedure of the rotational speed override value determination, this procedure also applies to the cutting feed override value.

The cutting feed override value and rotational speed override value determined by the main control unit 101 are respectively transmitted to the feed control unit 104 and the spindle control unit 105 and, as described above, respectively used in compensating the feed speed and rotational speed defined in the NC program.

Action and Effect

In the machine tool 1 having the above-described configuration, when performing a setup operation (attachment/detachment of tools T) at the tool magazine 21 of the tool changer 20, the operator first operates the setup mode set button 42a of the magazine operation panel 40 to bring the tool changer 20 into the setup mode. Subsequently, the operator operates the tool call key 42b and magazine drive button 42c of the magazine operation panel 40 to call the tool pot 22 to be operated to the tool attachment/detachment position. Thereafter, the operator performs an operation such as replacing a worn tool T attached to the tool pot 22 with another tool T or attaching a different tool T to the tool pot 22 in preparation for workpiece type change.

In order to improve the availability of the machine tool 1, the setup operation is often performed while the machine tool 1 is automatically operating in accordance with an NC program.

However, for example, if there is only one operator in the case where the setup operation is performed at the tool changer 20 while the machine tool 1 is automatically operating, the operator cannot promptly cope with a predetermined abnormality occurred in the machine tool body 10, which may result in enlargement of the abnormality.

Accordingly, the machine tool 1 according to this embodiment is configured such that the magazine operation panel 40 that is to be manually operated in the setup operation performed at the tool changer 20 has the abnormality avoidance operation unit 43 so that it is possible to cause the machine tool body 10 through the abnormality avoidance operation unit 43 to perform an abnormality avoidance operation. Therefore, even if a predetermined abnormality occurs in the machine tool body 10 while the operator is performing the setup operation at the tool changer the operator does not need to move to the front of the NC operation panel 30 and can quickly avoid the predetermined abnormality by operating the abnormality avoidance operation unit 43 of the magazine operation panel 40.

Specifically, for example, when an abnormal vibration (an example of the predetermined abnormality) occurs in the machine tool body 10 while the machine tool 1 is automatically operating, the operator can operate the rotational speed override switch 43c as an example of the abnormality avoidance operation unit 43 to increase or decrease the rotational speed of the spindle 14 being rotated by the spindle device 17 so as to shift the rotational speed of the spindle 14 from the resonance point, so that the abnormal vibration is avoided.

Moreover, since the lower limit value of the override value specified by the rotational speed override switch 43c in this embodiment is greater than zero (in this example, 50%), rotation of the spindle 14 is not stopped by the operation of the rotational speed override switch 43c. Therefore, contact between the workpiece and a tool T whose cutting force has been lost because of stop of rotation of the spindle 14 is prevented. Consequently, the workpiece is prevented from being damaged by such a tool T cutting into the workpiece, so that the workpiece reuse rate in the event of the abnormality is increased and the material cost is thereby reduced.

When a chatter vibration between the tool T and the workpiece (an example of the predetermined abnormality) occurs in the machine tool body 10 while the machine tool 1 is automatically operating, the operator can operate the cutting feed override switch 43b as an example of the abnormality avoidance operation unit 43 to increase or decrease the feed speed of the feed device 16 to an appropriate feed speed, so that the chatter vibration is avoided.

When the predetermined abnormality (an abnormal sound, an abnormal vibration, or the like) occurs in the machine tool body 10 while the machine tool 1 is automatically operating, the operator can press the feed hold button 43a as an example of the abnormality avoidance operation unit 43 to stop the feed operation of the feed device 16, so that contact between the tool T and the workpiece is prevented in advance or further progress of the machining of the workpiece is prevented with the tool T and the workpiece in contact with each other. This enables a series of operations for avoiding the predetermined abnormality (an operation of separating the workpiece and the tool T, which is described later) to be smoothly performed.

Pressing the feed hold button 43a stops driving of the feed device 16 but does not stop rotation of the spindle 14 by the spindle device 17. Therefore, the workpiece is prevented from being damaged by interference with the tool T when the feed driving is stopped; consequently, the workpiece reuse rate is increased.

When the predetermined abnormality occurs in the machine tool body 10 while the machine tool 1 is automatically operating, the operator can operate the jog feed operation unit 43d of the magazine operation panel 40 to cause the feed device 16 to perform the jog feed operation with a desired feed amount along any one of the X-axis, Y-axis, and Z-axis with the spindle 14 rotated. Thereby, the relative positional relationship between the workpiece and the tool T is changed so that the workpiece and the tool T are separated from each other. Therefore, the workpiece is prevented from being damaged by the workpiece and the tool T being left in contact with each other.

In this embodiment, the magazine operation panel 40 has, besides the abnormality avoidance operation unit 43, the priority mode button 44 for setting the priority operation mode and the controller 100 is configured to determine whether the priority operation mode is set in the magazine operation panel 40 or not. If simultaneously receiving an operation signal of the abnormality avoidance operation unit 43 from the magazine operation panel 40 and an operation signal from the NC operation panel 30 which is incompatible with the operation signal from the magazine operation panel 40 when it is determined that the priority operation mode is set, the controller 100 ignores the operation signal from the NC operation panel 30.

Thus, if incompatible operations are performed simultaneously in the abnormality avoidance operation unit 43 of the magazine operation panel 40 and in the NC operation panel 30 when the priority operation mode is set in the magazine operation panel 40, priority is always given to the operation in the abnormality avoidance operation unit 43 of the magazine operation panel 40. Therefore, setting the priority operation mode in the magazine operation panel 40 when the operator performs the setup operation at the tool changer 20 enables the operator to quickly cause the machine tool body 10 through the magazine operation panel 40 to perform the abnormality avoidance operation, without being disturbed by an operation performed in the NC operation panel 30.

Further, the controller 100 is configured to, when determining that the priority operation mode is set in the magazine operation panel 40, display on the display unit 31 in the NC operation panel 30 an indication that the priority operation mode is set in the magazine operation panel 40.

This configuration enables, for example, if an operation performed in the machine running operation unit 33 of the NC operation panel 30 by an operator who is different from the operator operating the magazine operation panel 40 is not activated, the different operator to visually recognize the indication that the priority operation mode is set in the magazine operation panel 40 displayed on the display unit 31; therefore, the operator can easily infer the possibility that the deactivation of the operation is not because of a failure of the NC operation panel 30 but because priority is given to an operation performed in the magazine operation panel 40.

Modification

Figure 6:
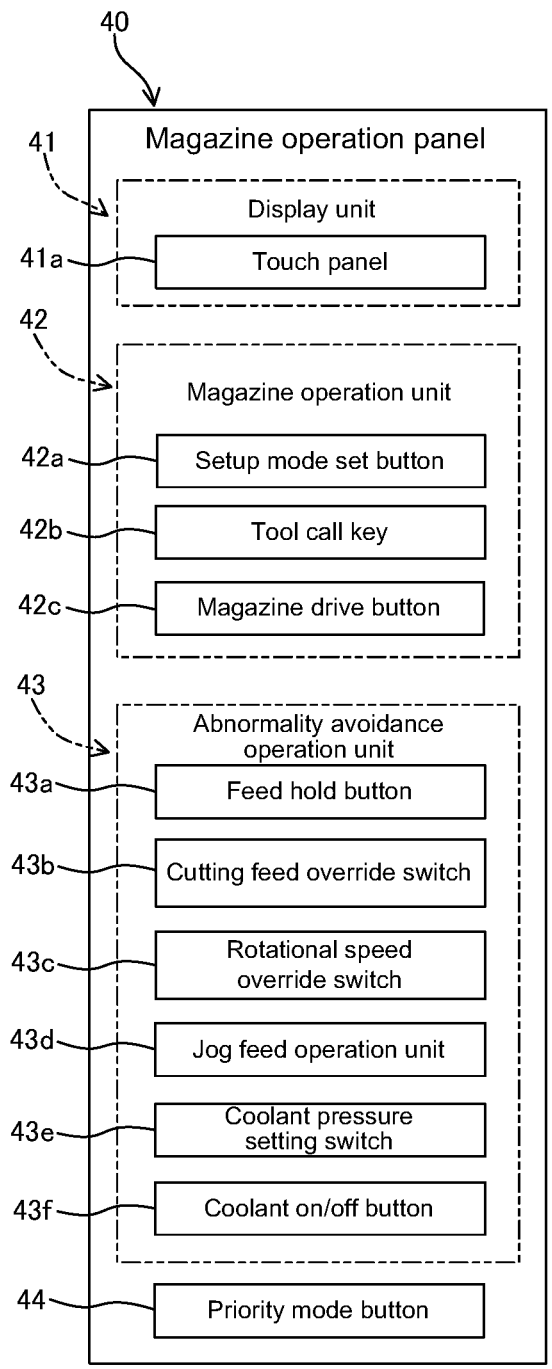
FIG. 6 is a diagram equivalent to FIG. 5 illustrating a modification of the embodiment.

FIG. 6 is a diagram equivalent to FIG. 5 illustrating a modification of the above-described embodiment. In this modification, the abnormality avoidance operation unit 43 of the magazine operation panel 40 is configured differently from that in the above-described embodiment. Note that the components in FIG. 6 identical to those in FIG. 5 are denoted by the same reference numerals as in FIG. 5 and detailed description thereof is omitted here.

Specifically, the abnormality avoidance operation unit 43 in this modification has a coolant pressure setting switch 43e and a coolant on/off button 43f in addition to the feed hold button 43a, the cutting feed override switch 43b, the rotational speed override switch 43c, and the jog feed operation unit 43d. The coolant pressure setting switch 43e and the coolant on/off button 43f each function as the fifth operation unit for changing the operational status of the coolant device 18.

The coolant pressure setting switch 43e has a configuration and a function similar to those of the coolant pressure setting switch 33h of the NC operation panel therefore, detailed description thereof is omitted. The coolant on/off button 43f has a configuration and function similar to those of the coolant on/off button 33g of the NC operation panel 30; therefore, description thereof is omitted.

The main control unit 101 is configured to be able to output driving signals corresponding to operation signals of the coolant pressure setting switch 43e and coolant on/off button 43f to the coolant control unit 106 to change the on/off status and coolant discharge pressure of the coolant device 18 (the operational status of the coolant device 18) via the coolant control unit 106.

Therefore, for example, when an abnormal vibration or an abnormal sound (an example of a predetermined abnormality) occurs in the machine tool body 10 due to abnormal heat generation of the tool T and workpiece or due to excessive supply of coolant while the machine tool 1 is automatically operating, the operator can operate the coolant pressure setting switch 43e or the coolant on/off button 43f to change the state of supply of coolant, so that the predetermined abnormality is avoided.

Other Embodiments

In the above-described embodiment and modification, if incompatible operations are performed simultaneously in the abnormality avoidance operation unit 43 of the magazine operation panel 40 and in the NC operation panel 30 when the priority operation mode is set in the magazine operation panel 40, priority is given to the operation performed in the abnormality avoidance operation unit 43 of the magazine operation panel 40 while the operation performed in the NC operation panel 30 is ignored. However, the present invention is not limited to this configuration. For example, a configuration is possible in which the priority operation mode is defined as a mode for only activating operation of the abnormality avoidance operation unit 43 of the magazine operation panel 40 and which one of incompatible operations performed in the abnormality avoidance operation unit 43 of the magazine operation panel 40 and the NC operation panel 30 is to be given priority is determined in accordance with a predetermined priority operation condition.

A possible example of the priority operation condition is that priority is given to the safer operation signal. In this case, a configuration is possible in which, when an operation signal from the NC operation panel 30 indicating that the rotational speed override value is to be decreased to 10% and an operation signal from the magazine operation panel 40 indicating that the rotational speed override value is to be decreased to 0% are simultaneously received in the main control unit 101, the operation signal indicating 0%, i.e., the lower override value, is regarded as the safer operation signal and given priority while the other operation signal indicating 10% is ignored. In this case, the definition of the term "safer" may be, for example, previously stored in the sequence program in the ROM. For example, the term "safer" may be defined as one indicating the higher override value. As for the case where incompatible operations are performed simultaneously in a unit other than the abnormality avoidance operation unit 43 of the magazine operation panel 40 and in the NC operation panel 30, the determination may be made as follows: without depending on the above-described priority operation condition, priority is given to the operation performed in the magazine operation panel 40 when the setup mode is set, while priority is given to the operation performed in the NC operation panel 30 when the setup mode is not set.

In the above-described embodiment and modification, when the override switch 33d, 33e of the NC operation panel 30 is operated after the override value is changed in the magazine operation panel 40 in the priority operation mode, the main control unit 101 determines that the current override value is the specified value of the operated override switch 33d, 33e. However, the present invention is not limited to this configuration. For example, a configuration is possible in which an operation for activating the override switch 33d, 33e of the NC operation panel 30 is previously determined and the override value is not changed by operation of the override switch 33d, 33e of the NC operation panel 30 until the predetermined operation is performed. Examples of the predetermined operation include an operation of preliminarily making the specified value of the override switch 33d, 33e of the NC operation panel 30 conform to the override value determined by the override switch 43b, 43c of the magazine operation panel 40. With this configuration, the operator operating the NC operation panel 30 can activate the override switch 33d, 33e only after making the specified value of the override switch 33d, 33e of the NC operation panel 30 conform to the current override value. That is to say, the operator can activate the override switch 33d, 33e of the NC operation panel 30 only after recognizing a deviation between the specified value of the override switch 33d, 33e and the current override value in his/her mind and carrying out an operation for correcting the deviation. Therefore, even when the specified value of the override switch 33d, 33e of the NC operation panel 30 and the actual override value are not the same, the operator can correct a sensory deviation by carrying out the predetermined operation; therefore, the operator can perform subsequent operations without being confused.

An actual operation example is described. For example, when the priority operation mode is activated with the rotational speed override switch 33e of the NC operation panel 30 set at the position of 100% and then the rotational speed override switch 43c of the magazine operation panel 40 is changed to the position of 40%, the current rotational speed is determined as 40% in the main control unit 101. In order to thereafter change the rotational speed override value to 100% in the NC operation panel 30, the rotational speed override switch 33e of the NC operation panel 30 is preliminarily turned to the position of 40% and then turned to the position of 100%.

In the above-described embodiment and modification, the feed hold state is defined as a state where the feed operation is stopped with the spindle 14 rotated. However, the present invention is not limited to this configuration. The feed hold state may be a state where both the rotation of the spindle 14 and the feed operation are stopped. Further, the discharge of coolant in the feed hold state may or may not be continued.

In the above-described embodiment and modification, an example has been described in which the lower limit value of the range of override value setting in the rotational speed override switch 43c of the magazine operation panel 40 is greater than 0% (in the above-described embodiment, 50%). However, the present invention is not limited to this configuration. The lower limit value may be 0%.

In the above-described embodiment and modification, an example has been described in which the cutting feed override switch 43b and the rotational speed override switch 43c in the magazine operation panel 40 are each composed of a rotary adjustment dial. However, the present invention is not limited to this configuration. For example, the override switches may be each composed of buttons each showing an amount of increase or decrease with respect to the current override value. Example of such buttons include buttons each having an indication such as "override: −10%", "override: 0%" or the like thereon.

For example, these buttons may be always displayed on the touch panel 41a of the magazine operation panel 40 or may be displayed on the touch panel 41a only when an abnormal vibration (e.g., a vibration having an amplitude equal to or more than a predetermined value or having a frequency out of a predetermined range) is detected by a vibration sensor provided in the machine tool body 10. The display of these buttons is controlled, for example, by the display control unit 109 having received a command from the main control unit 101. Note that these buttons are preferably composed of only buttons for changing the override value to a safer one. Examples of such buttons for changing the override value to a safer one include buttons for decreasing the override value. In the case where only buttons for decreasing the override value are displayed on the touch panel 41a of the magazine operation panel 40, an operation of increasing the override value cannot be performed in the magazine operation panel 40. It is preferred that the operation of increasing of the override value and the operation of starting (activating) the cycle can be performed only in the NC operation panel 30.

In the above-described embodiment and modification, the priority operation mode can be set in the magazine operation panel 40. However, the present invention is not limited to this configuration. For example, a configuration is possible in which the priority mode button 44 is not provided and the function of the priority operation mode is included in the setup mode. In this case, setting the setup mode allows the tool changer 20 to be manually operated and activates the abnormality avoidance operation unit 43 so that when incompatible operations are performed simultaneously in the abnormality avoidance operation unit 43 of the magazine operation panel 40 and in the NC operation panel 30, priority is given to the operation performed in the magazine operation panel 40. Note that which one of the operations performed in the NC operation panel 30 and the magazine operation panel 40 is given priority may be determined in accordance with a previously determined priority operation condition as described above.

In the above-described embodiment and modification, the tool changer 20 has been described as an example of the additional device. However, the additional device is not limited to a tool changer and may be, for example, a pallet changer that performs an operation of changing a pallet for attaching a workpiece thereto.

In the above-described embodiment and modification, the coolant device 18 has been described as an example of the machining auxiliary device. However, the machining auxiliary device is not limited to a coolant device and may be, for example, an air supply device that supplies air to a machined portion of the workpiece being machined by the tool T. In this case, the air supply device assists the machining of the workpiece by blowing off chips by air acting on the machined portion of the workpiece. The machining auxiliary device may be an oil mist generator that is to be used in semi-dry machining. In this case, the oil mist device assists the machining of the workpiece by suppressing heat generation of the tool T by an oil mist acting on the machined portion of the workpiece.

In the above-described embodiment and modification, the machine tool 1 is composed of a vertical machining center. However, the machine tool 1 is not limited to a vertical machining center and may be, for example, a horizontal machining center. Further, the machine tool 1 is not limited to a machining center and may be, for example, a turning center that performs turning or the like by causing a tool T to act on a workpiece held by a rotationally driven spindle.

In the above-described embodiment and modification, the controller 100 has, by way of example, the configuration as illustrated by the block diagram in FIG. 3. However, the controller 100 is not limited to this configuration and may have any configuration as long as it is possible to implement an abnormality avoidance operation by operating at least one of the feed device 16, spindle device 17, and coolant device 18 through operation of the abnormality avoidance operation unit 43 of the magazine operation panel 40 without powering off the machine tool 1.

In the above-described embodiment and modification, an example has been described in which the NC operation panel 30 is arranged on the front side of the machine tool body 10 and the magazine operation panel 40 is arranged on the left side of the machine tool body 10 as viewed from the front side of the machine tool body 10. However, the present invention is not limited to this configuration. The magazine operation panel 40 may be, for example, arranged on the right side or the front side of the machine tool body 10.

In the above-described embodiment and modification, the abnormality avoidance operation unit 43 of the magazine operation panel 40 has, by way of example, the configuration as illustrated by the block diagram in FIG. 5 or the configuration as illustrated by the block diagram in FIG. 6. However, the abnormality avoidance operation unit 43 is not limited to these configurations and may have any configuration as long as it is possible to implement an abnormality avoidance operation by changing the operational status of at least one of the feed device 16, spindle device 17, and coolant device 18. Further, the abnormality avoidance operation unit 43 is not limited to a hard key and may be composed of, for example, a soft key displayed on the touch panel.

In the above-described embodiment and modification, the magazine operation panel 40 may further have an emergency stop button separately from the abnormality avoidance operation unit 43. Upon receiving an operation signal of the emergency stop button, the main control unit 101 powers off the machine tool 1 to stop all operations in the machine tool 1 including the rotation of the spindle 14 by the spindle device 17. The emergency stop button is effective, for example, when a rotational abnormality of the spindle 14 occurs due to a failure of the spindle device 17.

In the above-described embodiment and modification, the abnormality avoidance operation unit 43 has the jog feed operation unit 43*d* for manual operation of the feed device 16; however, the abnormality avoidance operation unit 43 may have, for example, a manual pulse handle (manual pulse generator).

In the above-described embodiment and modification, the relative positional relationship between the workpiece and the tool T can be changed freely by the jog feed operation unit 43*d* as an example of the abnormality avoidance operation unit 43. However, the present invention is not limited to this configuration. For example, a configuration is possible in which if an operation signal of the jog feed operation unit 43*d* transmitted when the jog feed operation unit 43*d* is first operated is an operation signal of a direction which causes the workpiece and the tool T to move closer to each other (i.e., a direction which causes the tool T to cut into the workpiece), the main control unit 101 ignores the operation signal and display a warning message indicative thereof on the display unit 41 of the magazine operation panel 40. This configuration prevents the workpiece from being unintentionally cut by the rotating tool T; consequently, the workpiece reuse rate is increased.

REFERENCE SIGNS LIST

T Tool
1 Machine tool
10 Machine tool body
14 Spindle
16 Feed device
17 Spindle device
18 Coolant device (machining auxiliary device)
20 Tool changer (additional device)
30 NC operation panel (main operation panel)
31 Display unit (display unit of main operation panel)
33 Machine running operation unit
40 Magazine operation panel (sub-operation panel)
41 Display unit (display unit of sub-operation panel)
43 Abnormality avoidance operation unit
43*a* Feed hold button (third operation unit)
43*b* Cutting feed override switch (second operation unit, third operation unit)
43*c* Rotational speed override switch (first operation unit)
43*d* Jog feed operation unit (fourth operation unit)
43*f* Coolant pressure setting switch (fifth operation unit)
43*g* Coolant on/off button (fifth operation unit)
44 Priority mode button (setting operation unit)
100 Controller

The invention claimed is:

1. A machine tool comprising:
    a machine tool body including:
        a spindle device having a spindle to be rotationally driven while holding a workpiece or a tool;
        a feed device changing a positional relationship between the workpiece and the tool; and
        a machining auxiliary device assisting machining of the workpiece by the tool;
    an additional device attached to the machine tool body and configured to perform a predetermined operation accompanying the machining of the workpiece;
    a controller configured to operationally control the spindle device, feed device, and machining auxiliary device of the machine tool body and operationally control the additional device;
    a main operation panel having a machine running operation unit for operating the machine tool body and the additional device by automatic operation based on a Numerical Control (NC) program or by manual operation and configured to input an operation signal of the machine running operation unit to the controller; and
    a sub-operation panel having a device operation unit for operating the additional device by manual operation and configured to input an operation signal of the device operation unit to the controller,
    wherein:
    the sub-operation panel further has an abnormality avoidance operation unit for causing the machine tool body to perform an abnormality avoidance operation for avoiding a predetermined abnormality occurred in the machine tool body and is configured to input an operation signal of the abnormality avoidance operation unit to the controller; and the controller is configured to be able to, when receiving the operation signal of the abnormality avoidance operation unit from the sub-operation panel during the automatic operation based on the NC program, implement the abnormality avoidance operation by changing an operational status of at least one of the spindle device, feed device, and machining auxiliary device in accordance with the operation signal of the abnormality avoidance operation unit without powering off the machine tool.

2. The machine tool according to claim 1, wherein the controller is configured to be able to, when receiving the operation signal of the abnormality avoidance operation unit from the sub-operation panel during the automatic operation based on the NC program, implement the abnormality avoidance operation by changing the operational status of at least one of the spindle device, feed device, and machining auxiliary device in accordance with the operation signal of the abnormality avoidance operation unit without powering off the machine tool and without stopping rotation of the spindle.

3. The machine tool according to claim 1, wherein:
the abnormality avoidance operation unit includes a first operation unit for changing a rotational speed of the spindle of the machine tool body; and
the controller is configured to be able to, when receiving an operation signal of the first operation unit from the sub-operation panel during the automatic operation based on the NC program, implement the abnormality avoidance operation by causing the spindle device to perform an operation of changing the rotational speed of the spindle in accordance with the operation signal of the first operation unit, without powering off the machine tool and without stopping rotation of the spindle.

4. The machine tool according to claim 1, wherein:
the abnormality avoidance operation unit includes a second operation unit for changing a feed speed of the feed device; and
the controller is configured to be able to, when receiving an operation signal of the second operation unit from the sub-operation panel during the automatic operation based on the NC program, implement the abnormality avoidance operation by causing the feed device to perform an operation of changing the feed speed in accordance with the operation signal of the second operation unit, without powering off the machine tool and without stopping rotation of the spindle.

5. The machine tool according to claim 1, wherein:
the abnormality avoidance operation unit includes a third operation unit for stopping feed driving of the feed device; and
the controller is configured to be able to, when receiving an operation signal of the third operation unit from the sub-operation panel during the automatic operation based on the NC program, implement the abnormality avoidance operation by causing the feed device to perform an operation of stopping the feed driving, without powering off the machine tool and without stopping rotation of the spindle.

6. The machine tool according to claim 1, wherein:
the abnormality avoidance operation unit includes a fourth operation unit for causing the feed device to perform an operation for changing a positional relationship between the workpiece and the tool; and
the controller is configured to be able to, when receiving an operation signal of the fourth operation unit from the sub-operation panel during the automatic operation based on the NC program, implement the abnormality avoidance operation by operating the feed device in accordance with the operation signal of the fourth operation unit without powering off the machine tool and without stopping rotation of the spindle.

7. The machine tool according to claim 1, wherein:
the machining auxiliary device is a coolant device discharging a coolant toward the tool or the workpiece;
the abnormality avoidance operation unit includes a fifth operation unit for changing an operational status of the coolant device; and
the controller is configured to be able to, when receiving an operation signal of the fifth operation unit from the sub-operation panel during the automatic operation based on the NC program, implement the abnormality avoidance operation by changing the operational status of the coolant device as the machining auxiliary device in accordance with the operation signal of the fifth operation unit without powering off the machine tool and without stopping rotation of the spindle.

8. The machine tool according to claim 1, wherein:
the sub-operation panel has a setting operation unit for setting a priority operation mode; and
the controller is configured to determine via the setting operation unit of the sub-operation panel whether the priority operation mode is set or not and, if simultaneously receiving the operation signal of the abnormality avoidance operation unit from the sub-operation panel and an operation signal from the main operation panel incompatible with the operation signal of the abnormality avoidance operation unit when it is determined that the priority operation mode is set, ignore the operation signal from the main operation panel.

9. The machine tool according to claim 8, wherein:
the main operation panel has a display unit for displaying information thereon; and
the controller is configured to, when determining that the priority operation mode is set in the sub-operation panel, display on the display unit an indication that the priority operation mode is set in the sub-operation panel.

* * * * *